(12) United States Patent
Liu et al.

(10) Patent No.: US 12,109,656 B2
(45) Date of Patent: Oct. 8, 2024

(54) METAL DROP EJECTING THREE-DIMENSIONAL (3D) OBJECT PRINTER AND METHOD OF OPERATION FOR FORMING METAL SUPPORT STRUCTURES

(71) Applicant: ADDITIVE TECHNOLOGIES LLC, Palm City, FL (US)

(72) Inventors: Chu-Heng Liu, Penfield, NY (US); Paul J. McConville, Webster, NY (US); Jason M. LeFevre, Penfield, NY (US); Douglas K. Herrmann, Webster, NY (US); Seemit Praharaj, Webster, NY (US)

(73) Assignee: Additive Technologies LLC, Palm City, FL (US)

( * ) Notice: Subject to any disclaimer, the term of this patent is extended or adjusted under 35 U.S.C. 154(b) by 595 days.

(21) Appl. No.: 17/353,555

(22) Filed: Jun. 21, 2021

(65) Prior Publication Data

US 2022/0402060 A1    Dec. 22, 2022

(51) Int. Cl.
| | | |
|---|---|---|
| *B23K 9/04* | (2006.01) | |
| *B23K 9/16* | (2006.01) | |
| *B23K 9/32* | (2006.01) | |
| *B23K 35/38* | (2006.01) | |
| *B33Y 10/00* | (2015.01) | |
| *B33Y 30/00* | (2015.01) | |
| *B33Y 40/10* | (2020.01) | |
| *B33Y 50/02* | (2015.01) | |

(52) U.S. Cl.
CPC ............ *B23K 9/042* (2013.01); *B23K 9/164* (2013.01); *B23K 9/325* (2013.01); *B23K 35/383* (2013.01); *B33Y 10/00* (2014.12); *B33Y 30/00* (2014.12); *B33Y 40/10* (2020.01); *B33Y 50/02* (2014.12)

(58) Field of Classification Search
None
See application file for complete search history.

(56) References Cited

U.S. PATENT DOCUMENTS

| | | |
|---|---|---|
| 9,616,494 B2 | 4/2017 | Vader et al. |
| 10,040,119 B2 | 8/2018 | Vader et al. |
| 2017/0182598 A1* | 6/2017 | Crear .................. B33Y 10/00 |

(Continued)

FOREIGN PATENT DOCUMENTS

| | | | | |
|---|---|---|---|---|
| CN | 202317021 U | * | 7/2012 | |
| EP | 3708278 A1 | * | 9/2020 | ............. B22F 10/20 |

(Continued)

OTHER PUBLICATIONS

Machine translation of CN 2023317021U, Dec. 2023 (Year: 2023).*

*Primary Examiner* — Geoffrey S Evans
(74) *Attorney, Agent, or Firm* — Maginot Moore & Beck LLP

(57) ABSTRACT

A three-dimensional (3D) metal object manufacturing apparatus is configured to increase the oxidation of ejected melted metal drops for the formation of metal support structures during manufacture of a metal object with the apparatus. The oxidation can be increased by either increasing a distance between the ejector head and a platform supporting the metal object or by providing an air flow transverse to the direction of movement of the melted metal drops, or both.

20 Claims, 4 Drawing Sheets

(56) References Cited

U.S. PATENT DOCUMENTS

| | | | | |
|---|---|---|---|---|
| 2017/0232517 A1* | 8/2017 | Morton | ................... | B22F 10/38 |
| | | | | 419/29 |
| 2022/0134674 A1* | 5/2022 | Roca Vila | ............... | B33Y 40/20 |
| | | | | 700/119 |
| 2022/0234279 A1* | 7/2022 | Ulu | ........................ | B33Y 50/00 |

FOREIGN PATENT DOCUMENTS

| | | | | |
|---|---|---|---|---|
| WO | WO-9709141 A1 * | 3/1997 | ............. | B22D 23/00 |
| WO | WO-2016053263 A1 * | 4/2016 | ........... | B29C 64/153 |
| WO | WO-2020023006 A1 * | 1/2020 | ........... | B29C 64/364 |

* cited by examiner

METAL DROP EJECTING THREE-DIMENSIONAL (3D) OBJECT PRINTER AND METHOD OF OPERATION FOR FORMING METAL SUPPORT STRUCTURES

TECHNICAL FIELD

This disclosure is directed to three-dimensional (3D) object printers that eject melted metal drops to form objects and, more particularly, to the formation of metal support structures used to form objects with such printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material to construct a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes the meniscus of the melted metal at a nozzle of the receptacle to separate from the melted metal within the receptacle and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magneto-hydrodynamic (MHD) printer.

In the 3D object printing systems that use elastomer materials, temporary support structures are formed by using an additional ejector to eject drops of a different material to form supports for overhang and other object features that extend away from the object during formation of the object. Because these support structures are made from materials that are different than the materials that form the object they do not adhere or bond well with the object. Consequently, they can be easily separated from the object feature that they supported during object manufacture and removed from the object after object formation is finished. Such is not the case with metal drop ejecting systems. If the melted metal in the printer is used to form support structures with the metal being ejected to form the object, then the structure bonds strongly with the features of the object that need support while they solidify. Consequently, a significant amount of machining and polishing is needed to remove the supports from the object. Damage to the object can occur during this post-manufacture processing. Coordinating another metal drop ejecting printer using a different metal is difficult because the thermal conditions for the different metal can affect the build environment of the object forming system. For example, a support structure metal having a higher melting temperature can weaken or soften the metal forming the object or a support metal structure having a lower melting temperature can weaken when the object feature contacts the structure. Being able to form support structures that enable metal drop ejecting printers to form metal object overhangs and other extending features would be beneficial.

SUMMARY

A new method of operating a 3D metal object printer forms support structures that do not adhere tightly to object features supported by the structures without adversely impacting the environment of the 3D metal object printer. The method includes supplying inert gas around melted metal drops as the melted metal drops are ejected from a receptacle in an ejector head, detecting with a controller support structure layers in a digital model, generating machine-ready instructions that increase oxidation of ejected melted metal drops after the melted metal drops have been ejected from the receptacle within the ejector head, and executing the generated machine-ready instructions to operate the metal drop ejecting apparatus to form support structures with oxidated melted metal drops during formation of a metal object on a platform positioned to receive the melted metal drops ejected from the ejector head.

A new 3D metal object printer forms support structures that do not adhere tightly to object features supported by the structures without adversely impacting the environment of the 3D metal object printer. The new 3D metal object printer includes an ejector head having a vessel with a receptacle within the vessel, the ejector head being configured to eject melted metal drops from the receptacle, a heater configured to heat the vessel while the vessel is in the ejector head to a temperature sufficient to melt solid metal within the receptacle of the vessel, a platform positioned to receive melted metal drops ejected from the receptacle of the vessel, a source of inert gas that is configured to provide a flow of inert gas surrounding the melted metal drops as the melted metal drops move toward the platform, and a controller configured to detect support structure layers in a digital model, generate machine-ready instructions that increase oxidation of the ejected melted metal drops after the melted metal drops have been ejected, and execute the generated machine-ready instructions to operate the metal drop ejecting apparatus to form support structures with oxidated melted metal drops during formation of a metal object with the metal drop ejecting apparatus.

BRIEF DESCRIPTION OF THE DRAWINGS

The foregoing aspects and other features of a method for forms support structures that do not adhere tightly to object features supported by the structures without adversely impacting the environment of the 3D metal object printer and a 3D metal object printer that implements the method are explained in the following description, taken in connection with the accompanying drawings.

DETAILED DESCRIPTION

Figure 1:
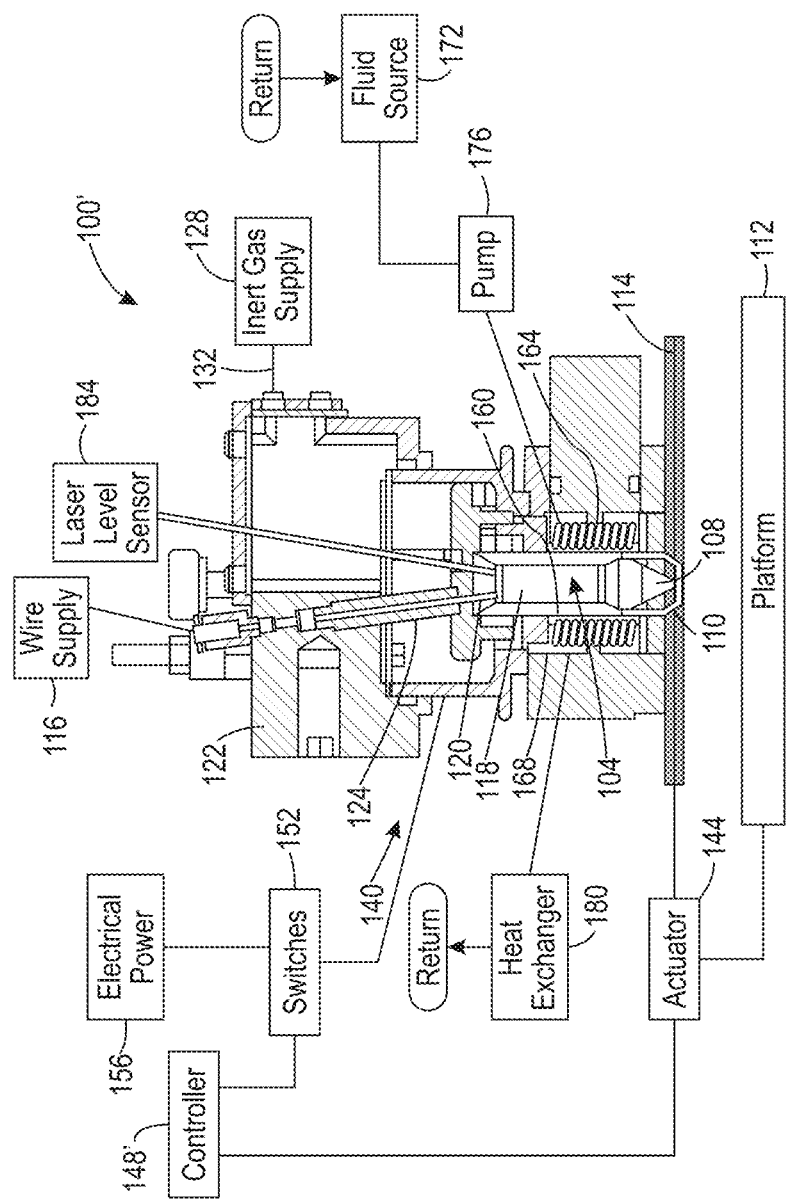
FIG. 1 depicts a new 3D metal object printer that forms support structures that do not adhere tightly to object features supported by the structures without adversely impacting the environment of the 3D metal object printer.
Figure 2:
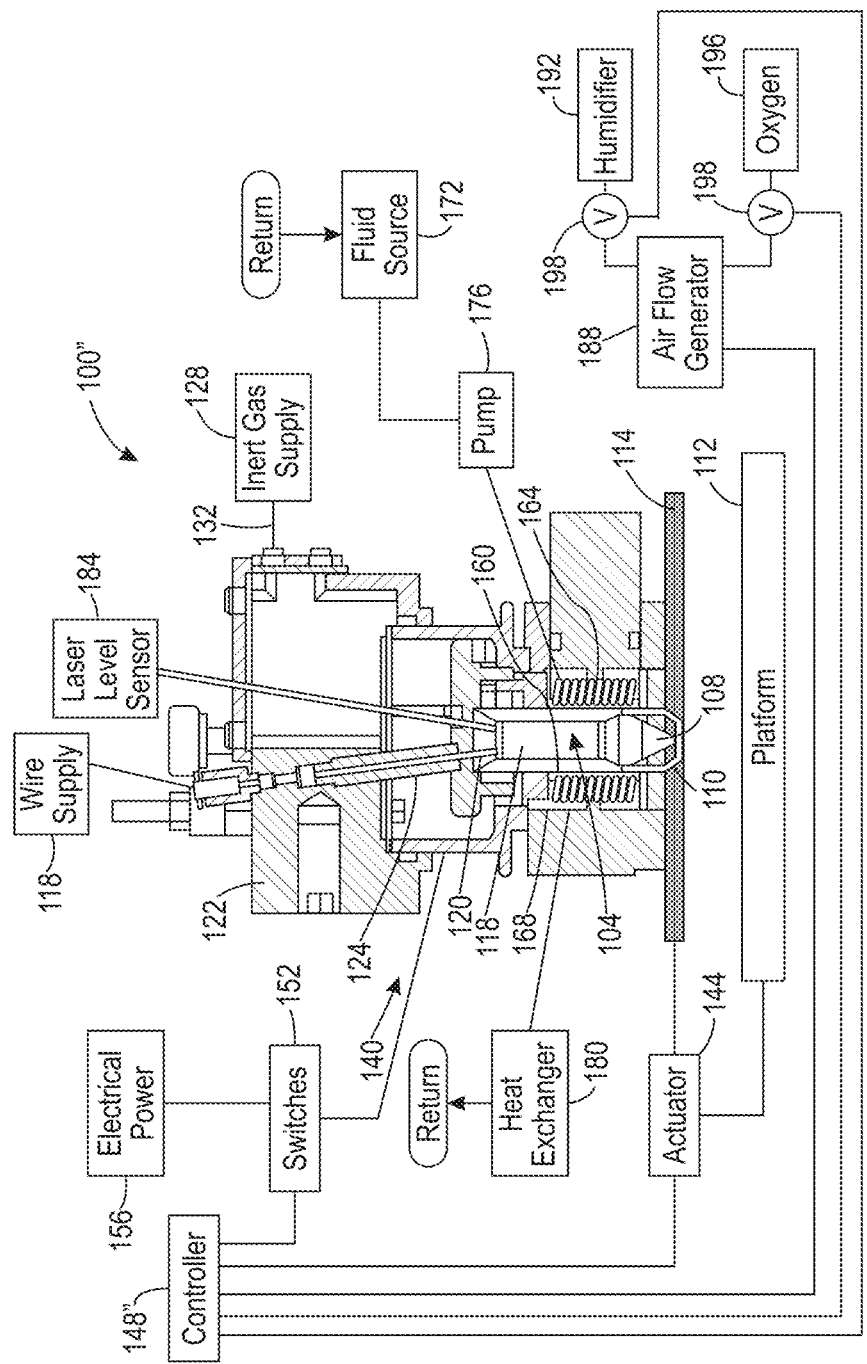
FIG. 2 depicts an alternative embodiment of a new 3D metal object printer that forms support structures that do not adhere tightly to object features supported by the structures without adversely impacting the environment of the 3D metal object printer.

For a general understanding of the environment for the 3D metal object printer and its operation as disclosed herein as well as the details for the printer and its operation, reference is made to the drawings. In the drawings, like reference numerals designate like elements.

Figure 4:
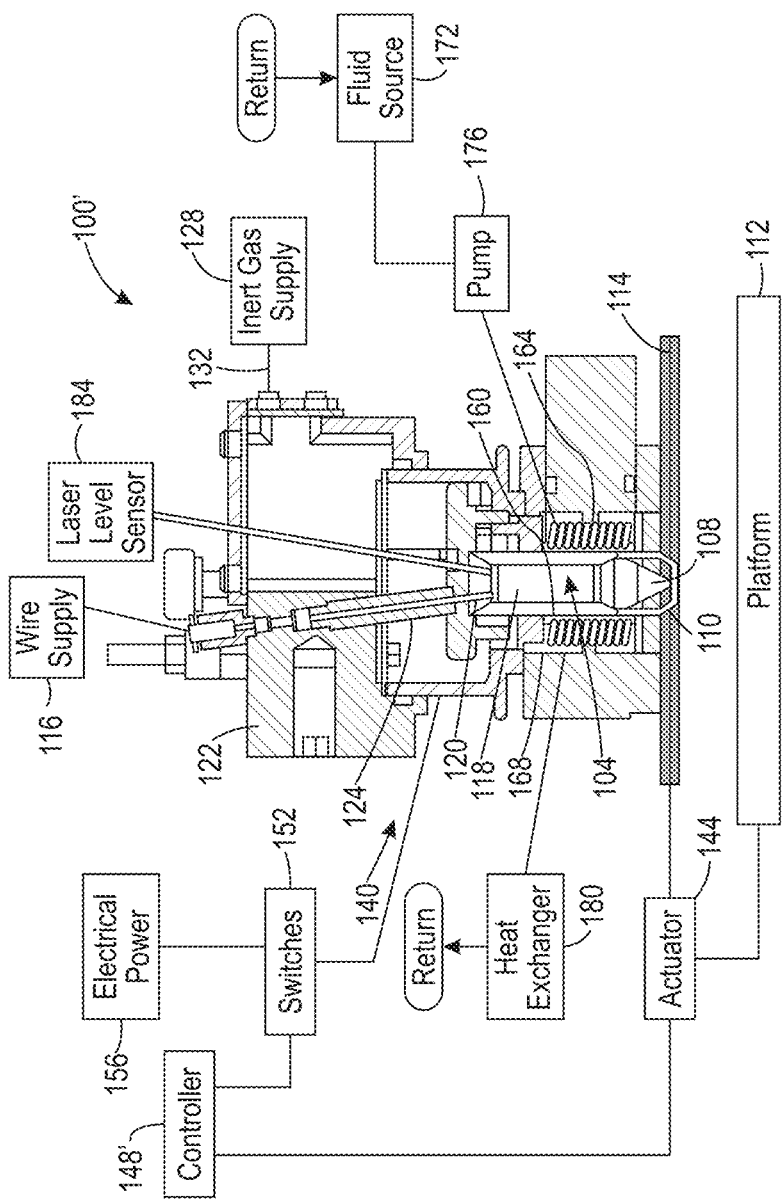
FIG. 4 depicts a prior art 3D metal printer that does not include components for forming support structures that do not adhere tightly to object features supported by the structures without adversely impacting the environment of the 3D metal object printer.

FIG. 4 illustrates an embodiment of a previously known 3D metal object printer 100 that ejects drops of a single melted metal to form an object without using support structures. In the printer of FIG. 4, drops of melted bulk metal are ejected from a receptacle of a removable vessel 104 having a single nozzle 108 and drops from the nozzle form swaths for layers of an object on a platform 112. As used in this document, the term "removable vessel" means a hollow container having a receptacle configured to hold a liquid or solid substance and the container as a whole is configured for installation and removal in a 3D metal object printer. As used in this document, the term "vessel" means a hollow container having a receptacle configured to hold a liquid or solid substance that may be configured for installation and removal from a 3D object metal printer. As used in this document, the term "bulk metal" means conductive metal available in aggregate form, such as wire of a commonly available gauge or pellets of macro-sized proportions.

With further reference to FIG. 4, a source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice fluidically connected to a volume within a receptacle of a vessel containing melted metal that is configured for the expulsion of melted metal drops from the receptacle within the vessel. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at the upper level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops. A gap between the nozzle and the surface on which an ejected metal drop lands is intentionally kept small enough that the inert gas exiting around the nozzle does not dissipate before the drop within this inert gas flow lands.

The ejector head 140 is movably mounted within Z-axis tracks for vertical movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and an uppermost surface of an object on the platform 112.

Moving the platform 112 in the X-Y plane as drops of molten metal are ejected toward the platform 112 forms a swath of melted metal drops on the object being formed. Controller 148 also operates actuators 144 to adjust the vertical distance between the ejector head 140 and the most recently formed layer on the substrate to facilitate formation of other structures on the object. While the molten metal 3D object printer 100 is depicted in FIG. 4 as being operated in a vertical orientation, other alternative orientations can be employed. Also, while the embodiment shown in FIG. 4 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls within a metal drop ejecting printer in which a heater, a coil, and a removable vessel of a 3D metal object printer are located. The removable vessel 104 and the heater 160 are located within such a chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148. The controller can selectively access the digital data model through a server or the like, a remote database in which the digital data model is stored, or a computer-readable medium in which the digital data model is stored. This three-dimensional model or other digital data model is processed by a slicer implemented with the controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, a polygonal mesh, or other intermediate representation, which in turn can be processed to generate machine instructions, such as g-code, for fabrication of the object by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and the uppermost layer of the object on the platform 112.

Using like reference numbers for like components, a new 3D metal object printer 100' is shown in FIG. 1. The controller 148' has been configured with programmed instructions stored in a non-transitory media operatively connected to the controller that, when executed by the controller, cause the controller to detect layers of metal support structures in the model data and to generate machine-ready instructions that operate one or more of the actuators 144 to maintain a distance between the nozzle 108 and the object or platform 112 that enables the inert gas exiting the orifice 110 to dissipate before the ejected metal drops land on the object or the platform. Because the inert gas about the ejected drops dissipates, oxygen and water in the air oxidize the metal drops to a degree sufficient to form metal support structures that do not adhere strongly to the object features the structures contact. Consequently, after manufacture of the object is completed, the support structures can be separated from the object without machining.

Using like reference numbers for like components, another embodiment of a new 3D metal object printer 100" is shown in FIG. 1. The controller 148" has been configured with programmed instructions stored in a non-transitory media operatively connected to the controller that, when executed by the controller, cause the controller to detect layers of metal support structures in the model data and to generate machine-ready instructions that operate the air flow generator 188 to produce an air flow transverse to the flight path of the ejected metal drops to dissipate the inert gas and introduce the ejected drops to oxygen and water before the ejected metal drops land on the object or the platform. Because the inert gas about the ejected drops dissipates, oxygen and water in the transverse air flow oxidize the metal drops to a degree sufficient to form metal support structures that do not adhere strongly to the object features the structures contact. Consequently, after manufacture of the object is completed, the support structures can be separated from the object without machining. A humidifier 192 and an oxygen source 196 are connected by valves 198 to the air flow generator 188. The controller 148" selectively controls the valves 198 to apply oxygen, water vapor, or both to the air flow generator 188 to alter the amount of oxygen and water vapor in the transverse air flow. In this manner, the amount of metal oxidation can be regulated to vary the degree of support structure layer adherence within the support structure and to the object. The air flow generator can be a fan, a pressurized source of air, such as an air jet, or the like.

The controllers 148' and 148" can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148' or controller 148" from either a scanning system or an online or work station connection for processing and generation of the signals that operate the components of the printer 100' or printer 100" to form an object and support structures on the platform 112.

Figure 3:
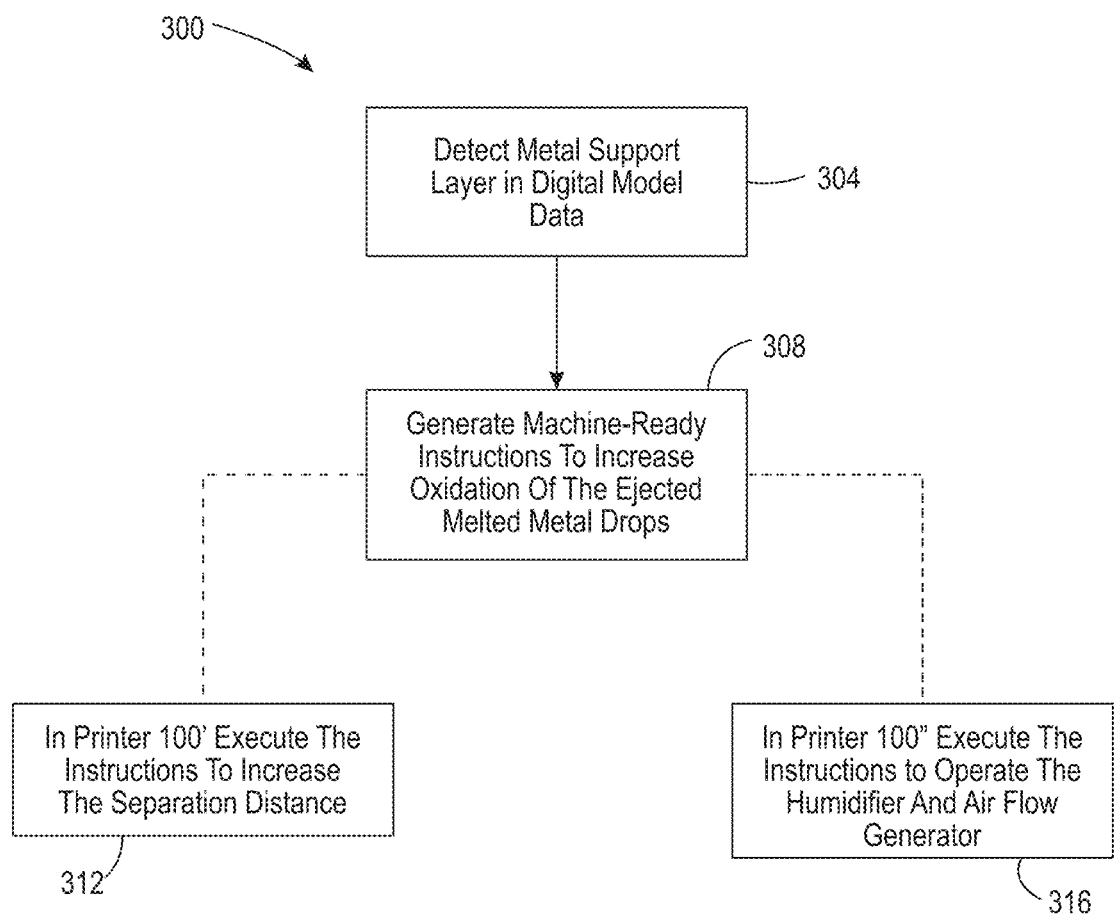
FIG. 3 is a flow diagram for a process that forms support structures that do not adhere tightly to object features supported by the structures without adversely impacting the environment of the 3D metal object printer.

A process for operating the 3D metal object printer 100' to form support structures during metal object formation is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' and controller 148" noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 3 is a flow diagram for a process 300 that introduces an environment conducive for metal oxidation to form support structures during metal object formation and the controllers 148' and 148" are configured to execute programmed instructions stored in a non-transitory memory operatively connected to implement the process. The process begins with detection of a metal support layer in the digital data model being processed to generate machine-ready instructions (block 304). The process generates machine-ready instructions that enhance the environment within the printer to form support structures with metal oxide material (block 308). In the printer 100', the machine-ready instructions are executed to increase the separation of the ejector head from the platform 112 so the inert gas dissipates before the ejected metal drops land (block 312). In the printer 100", the machine-ready instructions are executed to operate the air flow generator 188 and the valves 198 to introduce a transverse flow of air with varying amounts of oxygen and water vapor to dissipate the inert gas and oxidize the metal drops forming the support structure (block 316).

It will be appreciated that variants of the above-disclosed and other features and functions, or alternatives thereof, may be desirably combined into many other different systems, applications or methods. For example, while an embodiment that increases the separation between the ejector head and the platform to increase oxidation of the ejected metal drops has been described and another embodiment that produces a transverse air flow to increase the oxidation of the melted metal drops has been described, the embodiments can be combined so both mechanisms for increasing metal oxidation can be present in a single printer. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
   an ejector head having a vessel with a receptacle within the vessel, the ejector head being configured to eject melted metal drops from the receptacle;
   a heater configured to heat the vessel while the vessel is in the ejector head to a temperature sufficient to melt solid metal within the receptacle of the vessel;
   a platform positioned to receive melted metal drops ejected from the receptacle of the vessel;
   a source of inert gas that is configured to provide a flow of inert gas surrounding the melted metal drops as the melted metal drops move toward the platform; and
   a controller being configured to:
      detect support structure layers in a digital model;
      generate machine-ready instructions that increase oxidation of the ejected melted metal drops after the melted metal drops have been ejected; and
      execute the generated machine-ready instructions to operate the metal drop ejecting apparatus to form support structures with oxidated melted metal drops during formation of a metal object with the metal drop ejecting apparatus.

2. The metal drop ejecting apparatus of claim 1 further comprising:
   at least one actuator operatively connected to at least one of the ejector head and the platform; and
   the controller being operatively connected to the at least one actuator, the controller being further configured to:
      execute the generated machine-ready instructions to operate the at least one actuator to increase a distance between the ejector head and the platform to increase oxidation of the ejected melted metal drops before the ejected melted metal drops land.

3. The metal drop ejecting apparatus of claim 2 further comprising:
   an air flow generator; and
   the controller being further configured to:
      execute the generated machine-ready instructions to operate the air flow generator to direct a flow of air transversely to a path of the ejected melted metal drops to increase oxidation of the ejected melted metal drops before the ejected melted metal drops land.

4. The metal drop ejecting apparatus of claim 3 further comprising:
   an oxygen source operatively connected to the air flow generator through a second valve; and
   the controller being further configured to:
      execute the generated machine-ready instructions to operate the humidifier to increase an amount of oxygen in the flow of air produced by the air flow generator.

5. The metal drop ejecting apparatus of claim 3 further comprising:
   a humidifier operatively connected to the air flow generator through a first valve; and
   the controller being further configured to:
      execute the generated machine-ready instructions to operate the humidifier to increase an amount of water vapor in the flow of air produced by the air flow generator.

6. The metal drop ejecting apparatus of claim 5 further comprising:
   an oxygen source operatively connected to the air flow generator through a second valve; and
   the controller being further configured to:
      execute the generated machine-ready instructions to operate the humidifier to increase an amount of oxygen in the flow of air produced by the air flow generator.

7. The metal drop ejecting apparatus of claim 1 further comprising:
   an air flow generator; and
   the controller being further configured to:
      execute the generated machine-ready instructions to operate the air flow generator to direct a flow of air transversely to a path of the ejected melted metal drops to increase oxidation of the ejected melted metal drops before the ejected melted metal drops land.

8. The metal drop ejecting apparatus of claim 7 further comprising:
   an oxygen source operatively connected to the air flow generator through a second valve; and
   the controller being further configured to:
      execute the generated machine-ready instructions to operate the second valve to increase an amount of oxygen in the flow of air produced by the air flow generator.

9. The metal drop ejecting apparatus of claim 7 further comprising:
   a humidifier operatively connected to the air flow generator through a first valve; and
   the controller being further configured to:
      execute the generated machine-ready instructions to operate the first valve to increase an amount of water vapor in the flow of air produced by the air flow generator.

10. The metal drop ejecting apparatus of claim 9 further comprising:
    an oxygen source operatively connected to the air flow generator through a second valve; and the controller being further configured to:
    execute the generated machine-ready instructions to operate the second valve to increase an amount of oxygen in the flow of air produced by the air flow generator.

11. A method of operating a metal drop ejecting apparatus comprising:
    supplying inert gas around melted metal drops as the melted metal drops are ejected from a receptacle in an ejector head;
    detecting with a controller support structure layers in a digital model;
    generating machine-ready instructions with the controller that increase oxidation of ejected melted metal drops after the melted metal drops have been ejected from the receptacle within the ejector head; and
    executing the generated machine-ready instructions to operate the metal drop ejecting apparatus to form support structures with oxidated melted metal drops during formation of a metal object on a platform positioned to receive the melted metal drops ejected from the ejector head.

12. The method of claim 11 further comprising:
    executing the generated machine-ready instructions to operate at least one actuator operatively connected to one of the ejector head and the platform to increase a distance between the ejector head and the platform to increase oxidation of the ejected melted metal drops before the ejected melted metal drops land.

13. The method of claim 12 further comprising:
    executing the generated machine-ready instructions to operate an air flow generator to direct a flow of air transversely to a path of the ejected melted metal drops to increase oxidation of the ejected melted metal drops before the ejected melted metal drops land.

14. The method of claim 13 further comprising:
    executing the generated machine-ready instructions to operate a source of oxygen to increase an amount of oxygen in the flow of air produced by the air flow generator.

15. The method of claim 13 further comprising:
    executing the generated machine-ready instructions to operate a humidifier to increase an amount of water vapor in the flow of air produced by the air flow generator.

16. The method of claim 15 further comprising:
    executing the generated machine-ready instructions to operate a source of oxygen to increase an amount of oxygen in the flow of air produced by the air flow generator.

17. The method of claim 11 further comprising:
    executing the generated machine-ready instructions to operate an air flow generator to direct a flow of air transversely to a path of the ejected melted metal drops to increase oxidation of the ejected melted metal drops before the ejected melted metal drops land.

18. The method of claim 17 further comprising:
    executing the generated machine-ready instructions to operate a source of oxygen to increase an amount of oxygen in the flow of air produced by the air flow generator.

19. The method of claim 17 further comprising:
    executing the generated machine-ready instructions to operate a humidifier operatively connected to the air flow generator to increase an amount of water vapor in the flow of air produced by the air flow generator.

20. The method of claim 19 further comprising:
    executing the generated machine-ready instructions to operate a source of oxygen to increase an amount of oxygen in the flow of air produced by the air flow generator.

* * * * *